US010164666B2

(12) United States Patent
Khlat et al.

(10) Patent No.: US 10,164,666 B2
(45) Date of Patent: Dec. 25, 2018

(54) RADIO FREQUENCY FRONT END CIRCUITRY FOR MIMO AND CARRIER AGGREGATION

(71) Applicant: Qorvo US, Inc., Greensboro, NC (US)

(72) Inventors: Nadim Khlat, Cugnaux (FR); Marcus Granger-Jones, Scotts Valley, CA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 15/441,705

(22) Filed: Feb. 24, 2017

(65) Prior Publication Data

US 2017/0251474 A1      Aug. 31, 2017

Related U.S. Application Data

(60) Provisional application No. 62/299,798, filed on Feb. 25, 2016.

(51) Int. Cl.
| | | |
|---|---|---|
| *H04B 1/00* | (2006.01) | |
| *H04B 1/18* | (2006.01) | |
| *H04B 7/0413* | (2017.01) | |
| *H04L 5/00* | (2006.01) | |

(52) U.S. Cl.
CPC ............ *H04B 1/0092* (2013.01); *H04B 1/18* (2013.01); *H04B 7/0413* (2013.01); *H04L 5/001* (2013.01)

(58) Field of Classification Search
CPC ...... H04B 1/0057; H04B 7/0413; H04B 1/18; H04B 1/40; H04B 1/44; H04B 1/006; H04B 1/0064; H04B 1/50; H04L 5/001; H04L 5/1461; H04L 5/08; H04L 5/00; H03H 7/465; H03H 9/706; H03H 9/725
See application file for complete search history.

(56) References Cited

U.S. PATENT DOCUMENTS

| | | | | |
|---|---|---|---|---|
| 8,416,758 B1* | 4/2013 | Rousu | ...................... | H04B 1/18 370/343 |
| 9,118,100 B2* | 8/2015 | Khlat | ........................ | H01P 1/15 |
| 9,853,683 B2* | 12/2017 | Khlat | ...................... | H04B 1/44 |
| 9,859,943 B2* | 1/2018 | Khlat | ...................... | H04B 1/40 |
| 9,979,433 B2* | 5/2018 | Khlat | ........................ | H01P 1/15 |
| 10,009,058 B2* | 6/2018 | Khlat | ........................ | H01P 1/15 |
| 2013/0051284 A1* | 2/2013 | Khlat | ........................ | H04L 5/00 370/277 |
| 2013/0230080 A1* | 9/2013 | Gudem | ................ | H04B 1/0057 375/219 |
| 2013/0335160 A1* | 12/2013 | Khlat | ........................ | H01P 1/15 333/103 |
| 2013/0335161 A1* | 12/2013 | Khlat | ........................ | H01P 1/15 333/103 |

(Continued)

*Primary Examiner* — Matthew C Sams
(74) *Attorney, Agent, or Firm* — Withrow & Terranova, P.L.L.C.

(57) ABSTRACT

RF front end circuitry includes a first antenna node, a second antenna node, a diplexer, a first band filter, a second band filter, and switching circuitry. The diplexer may be used to separate signals for carrier aggregation, providing signals within a first RF frequency band to the first band filter and signals within a second RF frequency band to the second band filter. Further, by strategically arranging the switching circuitry, the diplexer may also be used as a multiple-input-multiple-output filter, such that additional filters are not required to support one or more MIMO modes of the RF front end circuitry.

11 Claims, 7 Drawing Sheets

(56) References Cited

U.S. PATENT DOCUMENTS

| | | | | |
|---|---|---|---|---|
| 2013/0337752 A1* | 12/2013 | Khlat | ................ | H01P 1/15 455/78 |
| 2013/0337753 A1* | 12/2013 | Khlat | ................ | H01P 1/15 455/78 |
| 2013/0337754 A1* | 12/2013 | Khlat | ................ | H01P 1/15 455/78 |
| 2014/0307599 A1* | 10/2014 | Rousu | ............ | H04B 1/006 370/297 |
| 2015/0303976 A1* | 10/2015 | Khlat | ................ | H01P 1/15 455/78 |
| 2017/0005639 A1* | 1/2017 | Khlat | ................ | H03H 7/465 |
| 2017/0104509 A1* | 4/2017 | Khlat | ................ | H04L 5/1461 |
| 2017/0237452 A1* | 8/2017 | Granger-Jones | ..... | H04B 1/0057 370/297 |

* cited by examiner

RADIO FREQUENCY FRONT END CIRCUITRY FOR MIMO AND CARRIER AGGREGATION

RELATED APPLICATIONS

This application claims the benefit of provisional patent application Ser. No. 62/299,798, filed Feb. 25, 2016, the disclosure of which is hereby incorporated herein by reference in its entirety.

FIELD OF THE DISCLOSURE

The present disclosure relates to radio frequency (RF) front end circuitry, and in particular to RF front end circuitry capable of supporting MIMO and carrier aggregation modes with a minimal number of filters.

BACKGROUND

As wireless communications technology continues to evolve, there is a focus on improving both reliability and speed. In recent years, technologies such as multiple-input-multiple-output (MIMO) and carrier aggregation have been used to increase both speed and reliability of a wireless connection. At a high level, MIMO and carrier aggregation allow multiple radio frequency (RF) signals to be simultaneously transmitted and/or received by a device. In the case of carrier aggregation, RF signals within different RF operating bands, different carriers within a single RF operating band, or both are simultaneously transmitted and then separated by a receiving device to obtain the data therein. Different data may be transmitted over each RF operating band and/or each carrier within a single RF operating band, thus increasing data throughput. In the case of MIMO, different RF signals are transmitted at the same frequency (e.g., by using spatial diversity) and then separated by a receiving device to obtain the data therein. The different RF signals may each carry different data, thereby increasing data throughput.

RF front end circuitry is generally responsible for processing received RF signals in order to support MIMO and/or carrier aggregation. In particular, RF filtering circuitry within the RF front end circuitry must be capable of separating received RF signals such that the data included therein can be obtained. To support carrier aggregation, the RF filtering circuitry must be capable of separating RF signals within different RF operating bands and/or different carriers within a single operating band. To support MIMO, the RF filtering circuitry must be capable of separating spatially diverse RF signals at the same frequency from one another. Generally, supporting carrier aggregation requires several grouped filters (i.e., multiplexers), where each grouped filter is configured to separate certain combinations of RF signals within different operating bands or RF signals within different carriers of the same operating band. Supporting MIMO generally requires a separate filter for each MIMO data stream, where each filter is configured to isolate RF signals at a particular RF frequency or a relatively small range of RF frequencies. Generally, filters used for carrier aggregation and filters used for MIMO are provided separately, thereby increasing the total number of filters in RF front end circuitry supporting both modes. As the number of carrier aggregation and/or MIMO modes supported by RF front end circuitry increases, the number of filters required for supporting these modes may quickly become impractical due to the area and insertion loss associated therewith.

In light of the above, there is a need for improved RF front end circuitry capable of supporting both MIMO and carrier aggregation modes while reducing the complexity of RF filtering circuitry used therein.

SUMMARY

The present disclosure relates to radio frequency (RF) front end circuitry, and in particular to RF front end circuitry capable of supporting MIMO and carrier aggregation modes with a minimal number of filters. In one embodiment, RF front end circuitry includes a first antenna node, a second antenna node, a diplexer, a first band filter, a second band filter, and switching circuitry. The diplexer is configured to pass RF signals within a first RF frequency band between a first diplexer node and a common node while attenuating RF signals within a second RF frequency band between the first diplexer node and the common node and pass RF signals within a second RF frequency band between a second diplexer node and the common node while attenuating RF signals within the first RF frequency band between the second diplexer node and the common node. The first band filter is configured to pass RF signals within a first RF operating band of the first RF frequency band between a first band filter node and a first input/output node while attenuating signals outside the first RF operating band. The second band filter is configured to pass RF signals within a second RF operating band with the second RF frequency band between a second band filter node and a second input/output node while attenuating signals outside the second RF operating band. The switching circuitry is configured to operate in a carrier aggregation mode and a multiple-input-multiple-output (MIMO) mode. In the carrier aggregation mode, the switching circuitry is configured to couple the common node to one of the first antenna node and the second antenna node, couple the first diplexer node to the first band filter node, and couple the second diplexer node to the second band filter node. Accordingly, RF signals within the first RF operating band and RF signals within the second RF operating band received at the first antenna node and the second antenna node can be separated and provided to the first input/output node and the second input/output node, respectively. In the MIMO mode, the switching circuitry is configured to couple the common node to one of the first antenna node and the second antenna node, couple the first band filter node to a different one of the first antenna node and the second antenna node, and couple the first diplexer node to a third input/output node. Accordingly, different RF signals within the first RF operating band received at the first antenna node and the second antenna node may be separately provided to the first input/output node and the third input/output node. By reusing the diplexer, which conventionally is provided only for separating signals to support one or more carrier aggregation configurations, as a filter during a MIMO mode of operation, MIMO may be supported in the RF front end circuitry without the use of additional filters.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is a functional schematic of radio frequency (RF) front end circuitry according to one embodiment of the present disclosure.

DETAILED DESCRIPTION

Figure 1:
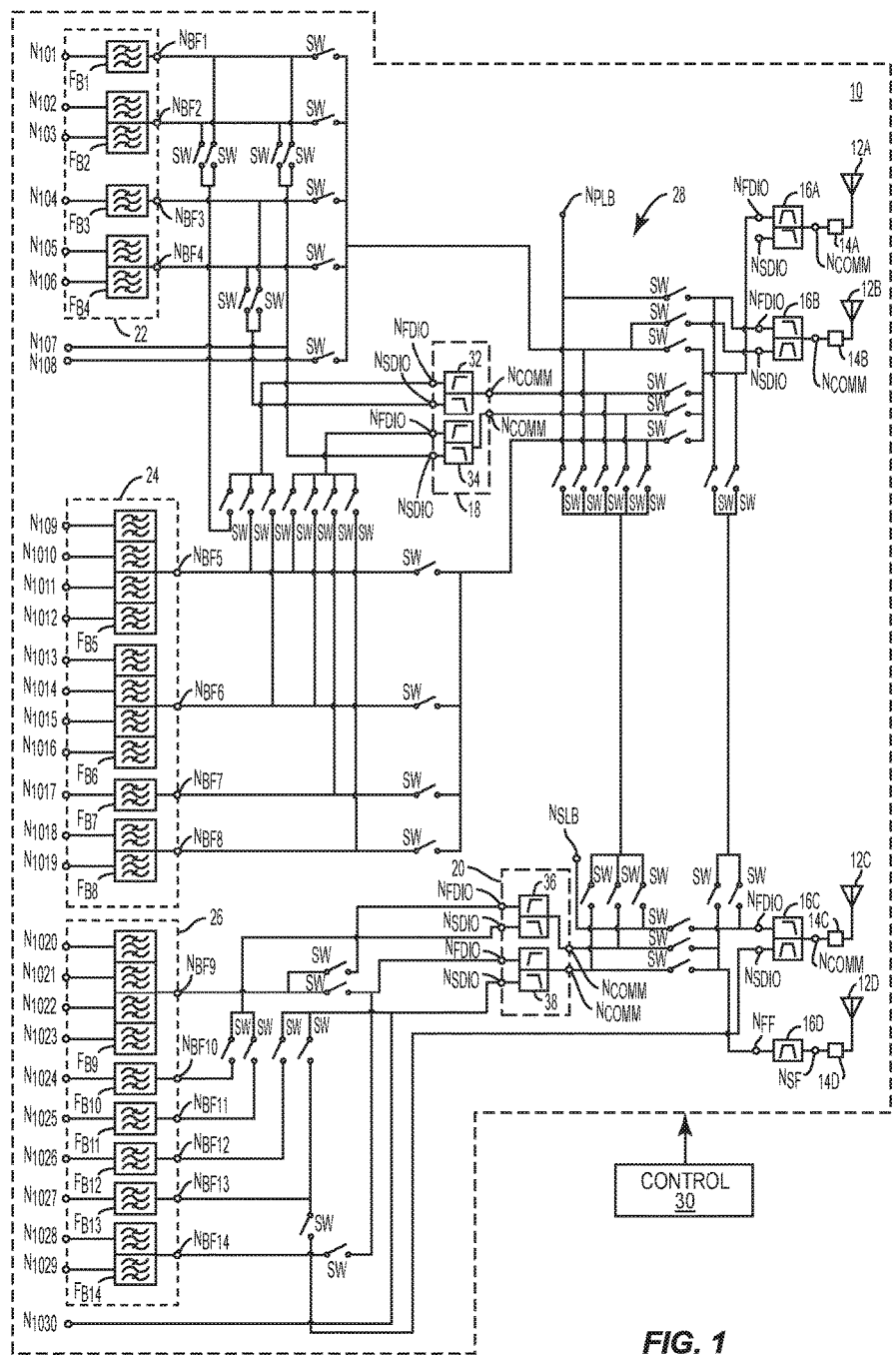

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 shows radio frequency (RF) front end circuitry 10 according to one embodiment of the present disclosure. The RF front end circuitry 10 includes a number of antennas 12, antenna tuning circuitry 14 coupled to each one of the antennas 12, antenna-side filtering circuitry 16 coupled to each one of the antennas 12 via the antenna tuning circuitry 14, primary intermediate filtering circuitry 18, secondary intermediate filtering circuitry 20, first primary band filtering circuitry 22, second primary band filtering circuitry 24, secondary band filtering circuitry 26, and switching circuitry 28 coupled between the antenna-side filtering circuitry 16, the primary intermediate filtering circuitry 18, the secondary intermediate filtering circuitry 20, the first primary band filtering circuitry 22, the second primary band filtering circuitry 24, and the secondary band filtering circuitry 26. Control circuitry 30 may be coupled to the antenna tuning circuitry 14 and the switching circuitry 28 in order to control the operation thereof as discussed below.

The antenna tuning circuitry 14 coupled to each one of the antennas 12 may be configured to present a desired impedance to the one of the antennas 12 coupled thereto in order to tune the antenna 12. In various embodiments, control signals from the control circuitry 30 may be provided to the antenna tuning circuitry 14 and determine the impedance presented to the one of the antennas 12 coupled thereto and thus the transmission and/or reception characteristics of the antenna 12.

First antenna-side filtering circuitry 16A may be a diplexer configured to pass RF signals within a first RF frequency band between a common node $N_{COMM}$ and a first diplexer input/output node $N_{FDIO}$ thereof while attenuating other signals between the common node $N_{COMM}$ and the first diplexer input/output node $N_{FDIO}$. Further, the first antenna-side filtering circuitry 16A may be configured to pass RF signals within a second RF frequency band between the common node $N_{COMM}$ and a second diplexer input/output node $N_{SDIO}$ while attenuating other signals between the common node $N_{COMM}$ and the second diplexer input/output node $N_{SDIO}$.

Second antenna-side filtering circuitry 16B may be a diplexer configured to pass RF signals within a third RF frequency band between a common node $N_{COMM}$ and a first diplexer input/output node $N_{FDIO}$ while attenuating other signals between the common node $N_{COMM}$ and the first diplexer input/output node $N_{FDIO}$. Further, the second antenna-side filtering circuitry 16B may be configured to pass RF signals within a fourth RF frequency band between the common node $N_{COMM}$ and the second diplexer input/output node $N_{SDIO}$ while attenuating other signals between the common node $N_{COMM}$ and the second diplexer input/output node $N_{SDIO}$.

Third antenna-side filtering circuitry 16C may be a diplexer configured to pass RF signals within the third RF frequency band between a common node $N_{COMM}$ and a first diplexer input/output node $N_{FDIO}$ while attenuating other signals between the common node $N_{COMM}$ and the first diplexer input/output node $N_{FDIO}$. Further, the third antenna-side filtering circuitry 16C may be configured to pass RF signals within the fourth RF frequency band between the common node $N_{COMM}$ and the second diplexer input/output node $N_{SDIO}$ while attenuating other signals between the common node $N_{COMM}$ and the second diplexer input/output node $N_{SDIO}$.

Fourth antenna-side filtering circuitry 16D may be a bandpass filter configured to pass RF signals within the first RF frequency band between a first filter node $N_{FF}$ and a second filter node $N_{SF}$ while attenuating other signals between the first filter node $N_{FF}$ and the second filter node $N_{SF}$.

The first RF frequency band, the second RF frequency band, the third RF frequency band, and the fourth RF frequency band may comprise any portion of the RF spectrum without departing from the principles of the present disclosure. In one embodiment, the first RF frequency band is a mid/high-band including frequencies between 1700 MHz and 2700 MHz, the second RF frequency band is an industrial-scientific-medical (ISM) band including frequencies between 2400 MHz and 2480 MHz, the third RF frequency band is a low-band including frequencies between 700 MHz and 1000 MHz, and the fourth RF frequency band is a high-band including frequencies between 2300 MHz and 2700 MHz. Those skilled in the art will appreciate that these frequency bands are merely exemplary, and that the principles of the present disclosure may be applied to any number of different RF frequency bands and combinations thereof without departing from the principles of the present disclosure.

The respective filter responses of the antenna-side filtering circuitry 16 coupled to each one of the antennas 12 may be provided in any suitable manner. Those skilled in the art will appreciate that any number of different filter responses and designs for achieving the same may be used to enable the functionality discussed above. In one embodiment, the first antenna-side filtering circuitry 16A provides a bandpass filter response between the common node $N_{COMM}$ and the first diplexer input/output node $N_{FDIO}$ thereof and provides a bandpass filter response between the common node $N_{COMM}$ and the second diplexer input/output node $N_{SDIO}$. The second antenna-side filtering circuitry 16B may provide a low-pass filter response between the common node $N_{COMM}$ and the first diplexer input/output node $N_{FDIO}$ thereof and provide a bandpass filter response between the common node $N_{COMM}$ and the second diplexer input/output node $N_{SDIO}$. The third antenna-side filtering circuitry 16C may provide a low-pass filter response between the common node $N_{COMM}$ and the first diplexer input/output node $N_{FDIO}$ thereof and provide a bandpass filter response between the common node $N_{COMM}$ and the second diplexer input/output node $N_{SDIO}$. The fourth antenna-side filtering circuitry 16D may provide a bandpass filter response between the first filter node $N_{FF}$ and the second filter node $N_{SF}$ thereof.

The primary intermediate filtering circuitry 18 may include a first primary intermediate diplexer 32 and a second primary intermediate diplexer 34, each of which may include a common node $N_{COMM}$, a first diplexer input/output node $N_{FDIO}$, and a second diplexer input/output node $N_{SDIO}$. The first primary intermediate diplexer 32 may be configured to pass RF signals within a fifth RF frequency band between the common node $N_{COMM}$ and the first diplexer input/output node $N_{FDIO}$ thereof while attenuating other signals between the common node $N_{COMM}$ and the first diplexer input/output node $N_{FDIO}$. Further, the first primary intermediate diplexer 32 may be configured to pass RF signals within a sixth RF frequency band between the common node $N_{COMM}$ and the second diplexer input/output node $N_{SDIO}$ while attenuating other signals between the common node $N_{COMM}$ and the second diplexer input/output node $N_{SDIO}$.

The second primary intermediate diplexer 34 may be configured to pass RF signals within the fifth RF frequency band between the common node $N_{COMM}$ and the first diplexer input/output node $N_{FDIO}$ thereof while attenuating other signals between the common node $N_{COMM}$ and the first diplexer input/output node $N_{FDIO}$. Further, the second primary intermediate diplexer 34 may be configured to pass RF signals within a seventh RF frequency band between the common node $N_{COMM}$ and the second diplexer input/output node $N_{SDIO}$ while attenuating other signals between the common node $N_{COMM}$ and the second diplexer input/output node $N_{SDIO}$.

In one embodiment, the first primary intermediate diplexer 32 is further configured to pass RF signals within the seventh RF frequency band between the common node $N_{COMM}$ and the first diplexer input/output node $N_{FDIO}$ thereof.

The secondary intermediate filtering circuitry 20 may include a first secondary intermediate diplexer 36 and a second secondary intermediate diplexer 38, each of which may include a common node $N_{COMM}$, a first diplexer input/output node $N_{FDIO}$, and a second diplexer input/output node $N_{SDIO}$. The first secondary intermediate diplexer 36 may operate similar to the first primary intermediate diplexer 32 discussed above, and the second secondary intermediate diplexer 38 may operate similar to the second primary intermediate diplexer 34 discussed above.

The fifth RF frequency band, the sixth RF frequency band, and the seventh RF frequency band may comprise any portion of the RF spectrum without departing from the principles of the present disclosure. As discussed herein, RF frequency bands generally refer to portions of the RF spectrum including multiple RF operating bands, where RF operating bands are portions of the RF spectrum defined by one or more wireless communications such as Third Generation Partnership Project (3GPP) Long Term Evolution (LTE) standards. In one embodiment, the fifth RF frequency band is a mid-band including frequencies between 1800 MHz and 2200 MHz, the sixth RF frequency band includes a portion of the high-band between 2300 MHz and 2400 MHz, and the seventh RF frequency band includes a portion of the high-band between 2400 MHz and 2700 MHz. Together, the sixth RF frequency band and the seventh RF frequency band may make up the fourth RF frequency band or any portion thereof, such that each one of the sixth RF frequency band and the seventh RF frequency band is a subset of the fourth RF frequency band. Those skilled in the art will appreciate that these frequency bands are merely exemplary, and that the principles of the present disclosure may be applied to any number of different RF frequency bands and combinations thereof without departing from the principles of the present disclosure.

As discussed in co-assigned and co-pending U.S. patent application Ser. No. 15/432,357, the contents of which are hereby incorporated by reference in their entirety, the primary purpose of the primary intermediate filtering circuitry 18 and the secondary intermediate filtering circuitry 20 is to separate RF signals within the mid-band from RF signals within the high-band. This is a difficult task, as RF signals at the upper end of the mid-band and the lower end of the high-band are very close in frequency (i.e., ~100 MHz apart). By providing the primary intermediate filtering circuitry 18 and the secondary intermediate filtering circuitry 20 as described, carrier aggregation including diversity multiple-input-multiple-output (MIMO) may be performed between any mid-band RF signals and any high-band RF signals by providing one of the first primary intermediate diplexer 32 and the second primary intermediate diplexer 34 in a first signal path in the RF front end circuitry 10, and providing one of the first secondary intermediate diplexer 36 and the second secondary intermediate diplexer 38 in a second signal path of the RF front end circuitry 10. In non-carrier aggregation configurations, the primary intermediate filtering circuitry 18 and the secondary intermediate filtering circuitry 20 may be bypassed in order to avoid the insertion loss and other performance deficits that may be associated therewith.

The first primary band filtering circuitry 22 may include a number of band filters $F_B$ each configured to isolate RF signals within one or more RF operating bands of the fourth RF frequency band. Each one of the band filters $F_B$ is coupled between a band filter node $N_{BF}$ and one or more input/output nodes $N_{IO}$, and is configured to pass RF signals within one or more RF operating bands of the fourth RF frequency band between the band filter node $N_{BF}$ and the one or more input/output nodes $N_{IO}$ while attenuating signals outside the desired one or more RF operating bands.

In one embodiment, the first primary band filtering circuitry 22 includes a first band filter $F_{B1}$ configured to pass RF signals within a first RF operating band between a first band filter node $N_{BF1}$ and a first input/output node $N_{IO1}$ while attenuating other signals between the first band filter node $N_{BF1}$ and the first input/output node $N_{IO1}$, a second band filter $F_{B2}$ configured to pass RF receive signals within a second RF operating band between a second band filter node $N_{BF2}$ and a second input/output node $N_{IO2}$ while attenuating other signals between the second band filter node $N_{BF2}$ and the second input/output node $N_{IO2}$ and pass RF transmit signals within the second RF operating band between a third input/output node $N_{IO3}$ and the second band filter node $N_{BF2}$ while attenuating other signals between the third input/output node $N_{IO3}$ and the second band filter node $N_{BF2}$, a third band filter $F_{B3}$ configured to pass RF signals within a third RF operating band between a third band filter node $N_{BF3}$ and a fourth input/output node $N_{IO4}$ while attenuating other signals between the third band filter node $N_{BF3}$ and the fourth input/output node $N_{IO4}$, and a fourth band filter $F_{B4}$ configured to pass RF receive signals within a fourth RF operating band between a fourth band filter node $N_{BF4}$ and a fifth input/output node $N_{IO5}$ while attenuating other signals between the fourth band filter node $N_{BF4}$ and the fifth input/output node $N_{IO5}$ and pass RF transmit signals between a sixth input/output node $N_{IO6}$ and the fourth band filter node $N_{BF4}$ while attenuating other signals between the sixth input/output node $N_{IO6}$ and the fourth band filter node $N_{BF4}$. While not shown, each one of the input/output nodes $N_{IO}$ may be coupled to a downstream power amplifier (in the case that RF transmit signals are provided to the node) or low-noise amplifier (in the case that RF receive signals are received from the node). A seventh input/output node $N_{IO7}$ and an eighth input/output node $N_{IO8}$ in the first primary band filtering circuitry 22 may not be associated with a band filter $F_B$ such that these input/output nodes $N_{IO}$ connect directly to a downstream low-noise amplifier (not shown) in certain modes as discussed in detail below.

The first RF operating band, the second RF operating band, the third RF operating band, and the fourth RF operating band may be any of the 3GPP LTE RF operating bands. In one embodiment, the first RF operating band is 3GPP LTE band 41, which is a time division duplex (TDD) band including frequencies between 2496 MHz and 2690 MHz. The second RF operating band may be 3GPP LTE band 7, which is a frequency division duplex (FDD) band including transmit frequencies between 2500 MHz and 2570 MHz and receive frequencies between 2620 MHz and 2690 MHz. The third RF operating band may be 3GPP LTE band 40, which is a TDD band including frequencies between 2300 MHz and 2400 MHz. The fourth RF operating band may be 3GPP LTE band 30, which is an FDD band including transmit frequencies between 2305 MHz and 2315 MHz and receive frequencies between 2350 MHz and 2360 MHz.

The second primary band filtering circuitry 24 may include a fifth band filter $F_{B5}$ configured to pass RF transmit signals within a fifth RF operating band between a ninth input/output node $N_{IO9}$ and a fifth band filter node $N_{BF5}$ while attenuating other signals between the ninth input/output node $N_{IO9}$ and the fifth band filter node $N_{BF5}$, pass RF receive signals within the fifth RF operating band between the fifth band filter node $N_{BF5}$ and a tenth input/output node $N_{IO10}$ while attenuating other signals between the fifth band filter node $N_{BF5}$ and the tenth input/output node $N_{IO10}$, pass RF transmit signals within a sixth RF operating band between an eleventh input/output node $N_{IO11}$ and the fifth band filter node $N_{BF5}$ while attenuating other signals between the eleventh input/output node $N_{IO11}$ and the fifth band filter node $N_{BF5}$, and pass RF receive signals within the sixth operating band between the fifth band filter node $N_{BF5}$ and a twelfth input/output node $N_{IO12}$ while attenuating other signals between the fifth band filter node $N_{BF5}$ and the twelfth input/output node $N_{IO12}$, a sixth band filter $F_{B6}$ configured to pass RF transmit signals within the fifth operating band between a thirteenth input/output node $N_{IO13}$ and a sixth band filter node $N_{BF6}$ while attenuating other signals between the thirteenth input/output node $N_{IO13}$ and the sixth band filter node $N_{BF6}$, pass RF transmit signals within a seventh RF operating band between the sixth band filter node $N_{BF6}$ and a fourteenth input/output node $N_{IO14}$ while attenuating other signals between the sixth band filter node $N_{BF6}$ and the fourteenth input/output node $N_{IO14}$, pass RF receive signals within an eighth RF operating band between the sixth band filter node $N_{BF6}$ and a fifteenth input/output node $N_{IO15}$ while attenuating other signals between the sixth band filter node $N_{BF6}$ and the fifteenth input/output node $N_{IO15}$, and pass RF receive signals within the seventh RF operating band between the sixth band filter node $N_{BF6}$ and a sixteenth input/output node $N_{IO16}$ while attenuating other signals between the sixth band filter node $N_{BF6}$ and the sixteenth input/output node $N_{IO16}$, a seventh band filter $F_{B7}$ configured to pass RF transmit signals within a ninth RF operating band between a seventh band filter node $N_{BF7}$ and a seventeenth input/output node $N_{IO17}$ while attenuating other signals between the seventh band filter node $N_{BF7}$ and the seventeenth input/output node $N_{IO17}$, and an eighth band filter $F_{B8}$ configured to pass RF receive signals within the ninth RF operating band between an eighth band filter node $N_{BF8}$ and an eighteenth input/output node $N_{IO18}$ while attenuating other signals between the eighth band filter node $N_{BF8}$ and the eighteenth input/output node $N_{IO18}$, and pass RF receive signals within a tenth RF operating band between the eighth band filter node $N_{BF8}$ and a nineteenth input/output node $N_{IO19}$ while attenuating signals outside the tenth RF operating band between the eighth band filter node $N_{BF8}$ and the nineteenth input/output node $N_{IO19}$. While not shown, each one of the input/output nodes $N_{IO}$ may be coupled to a downstream power amplifier (in the case that RF transmit signals are provided to the node) or low-noise amplifier (in the case that RF receive signals are received from the node).

The fifth RF operating band, the sixth RF operating band, the seventh RF operating band, the eighth RF operating band, the ninth RF operating band, and the tenth RF operating band may be any of the 3GPP LTE RF operating bands. In one embodiment, the fifth RF operating band is 3GPP LTE operating band 66, which is an FDD band including transmit frequencies between 1710 MHz and 1780 MHz and receive frequencies between 2110 MHz and 2200 MHz. Notably, 3GPP LTE band 4, which is also an FDD band including transmit frequencies between 1710 MHz and 1755 MHz and receive frequencies between 2110 MHz and 2155 MHz is a subset of 3GPP LTE band 66, and thus these bands are interchangeable. Further the transmit frequencies of 3GPP LTE band 66 may overlap with those of 3GPP LTE band 3, which is an FDD band including transmit frequencies between 1710 MHz and 1785 MHz and receive frequencies between 1805 MHz and 1880 MHz, and thus the sixth band filter $F_{B6}$ may also pass RF transmit signals within 3GPP LTE band 3 between the ninth input/output node $N_{IO9}$ and the fifth band filter node $N_{BF6}$ as discussed above. The sixth RF operating band may be 3GPP LTE band 25, which is an FDD band including transmit frequencies between 1850 MHz and 1915 MHz and receive frequencies between 1930 MHz and 1995 MHz. The seventh operating band may be 3GPP LTE band 1, which is an FDD band including transmit frequencies between 1920 MHz and 1980 MHz and receive frequencies between 2110 MHz and 2170 MHz. Notably, the receive frequencies of 3GPP LTE band 1 overlap with those of 3GPP LTE band 4, and thus the seventh band filter $F_B$, may also pass RF receive signals within 3GPP LTE band 4 between the seventh band filter node $N_{BF7}$ and the sixteenth input/output node $N_{IO16}$. The eighth RF operating band may be 3GPP LTE band 3 discussed above. The ninth RF operating band may be 3GPP LTE band 39, which is a TDD band including frequencies between 1880 MHz and 1920 MHz. The tenth RF operating band may be 3GPP LTE band 34, which is a TDD operating band including frequencies between 2010 MHz and 2025 MHz.

The primary purpose of the secondary band filtering circuitry 26 may be to isolate different secondary RF receive signals (e.g., MIMO diversity signals) for further processing. Accordingly, the secondary band filtering circuitry 26 conventionally only includes band filters $F_B$ for isolating RF receive signals. However, as discussed in co-assigned and co-pending U.S. patent application Ser. No. 15/289,476, now U.S. Pat. No. 9,853,683, the contents of which are hereby incorporated by reference in their entirety, placing at least one band filter $F_B$ in the secondary band filtering circuitry 26 and a power amplifier (not shown) for supporting RF transmit signals may be useful in certain inter-band uplink carrier aggregation configurations, as it allows for antenna-to-antenna isolation between the uplink carrier aggregation signals and thus avoids problems that may otherwise occur due to intermodulation distortion.

Accordingly, the secondary band filtering circuitry 26 may include a ninth band filter $F_{B9}$ configured to pass RF transmit signals within the fifth RF operating band between a twentieth input/output node $N_{IO20}$ and a ninth band filter node $N_{BF9}$ while attenuating other signals between the twentieth input/output node $N_{IO20}$ and the ninth band filter node $N_{BF9}$, pass RF receive signals within the eighth RF operating band between the ninth band filter node $N_{BF9}$ and a twenty-first input/output node $N_{IO21}$ while attenuating other signals between the ninth band filter node $N_{BF9}$ and the twenty-first input/output node $N_{IO21}$, pass RF receive signals within the fifth RF operating band between the ninth band filter node $N_{BF9}$ and a twenty-second input/output node $N_{IO22}$ while attenuating other signals between the ninth band filter node $N_{BF9}$ and the twenty-second input/output node $N_{IO22}$, and pass RF receive signals within the sixth RF operating band between the ninth band filter node $N_{BF9}$ and a twenty-third input/output node $N_{IO23}$ while attenuating other signals between the ninth band filter node $N_{BF9}$ and the twenty-third input/output node $N_{IO23}$, a tenth band filter $F_{B10}$ configured to pass RF receive signals within the fourth RF operating band between a tenth band filter node $N_{BF10}$ and a twenty-fourth input/output node $N_{IO24}$ while attenuating other signals between the tenth band filter node $N_{BF10}$ and the twenty-fourth input/output node $N_{IO24}$, an eleventh band filter $F_{B11}$ configured to pass RF receive signals within the third RF operating band between an eleventh band filter node $N_{BF11}$ and a twenty-fifth input/output node $N_{IO25}$ while attenuating other signals between the eleventh band filter node $N_{BF11}$ and the twenty-fifth input/output node $N_{IO25}$, a twelfth band filter $F_{B12}$ configured to pass RF receive signals within the second RF operating band between a twelfth band filter node $N_{BF12}$ and a twenty-sixth input/output node $N_{IO26}$ while attenuating other signals between the twelfth band filter node $N_{BF12}$ and the twenty-sixth input/output node $N_{IO26}$, a thirteenth band filter $F_{B13}$ configured to pass RF receive signals within the first RF operating band between a thirteenth band filter node $N_{BF13}$ and a twenty-seventh input/output node $N_{IO27}$ while attenuating other signals between the thirteenth band filter node $N_{BF13}$ and the twenty-seventh input/output node $N_{IO27}$, and a fourteenth band filter $F_{B14}$ configured to pass RF receive signals within the ninth RF operating band between a fourteenth band filter node $N_{BF14}$ and a twenty-eighth input/output node $N_{IO28}$ while attenuating other signals between the fourteenth band filter node $N_{BF14}$ and the twenty-eighth input/output node $N_{IO28}$ and pass RF receive signals within the tenth RF operating band between the fourteenth band filter node $N_{BF14}$ and a twenty-ninth input/output node $N_{IO29}$ while attenuating other signals between the fourteenth band filter node $N_{BF14}$ and the twenty-ninth input/output node $N_{IO29}$. While not shown, each one of the input/output nodes $N_{IO}$ may be coupled to a downstream power amplifier (in the case that RF transmit signals are provided to the node) or low-noise amplifier (in the case that RF receive signals are received from the node). A thirtieth input/output node $N_{IO30}$ from the secondary band filtering circuitry 26 may not be associated with a band filter $F_B$ such that this input/output node $N_{IO}$ connects directly to a downstream low-noise amplifier (not shown) in certain modes as discussed below.

The switching circuitry 28 may include a number of switches SW coupled between the antenna-side filtering circuitry 16, the primary intermediate filtering circuitry 18, the secondary intermediate filtering circuitry 20, the first primary band filtering circuitry 22, the second primary band filtering circuitry 24, and the secondary band filtering circuitry 26 as shown in FIG. 1. Based on control signals provided by the control circuitry 30, the switching circuitry 28 may form a number of signal paths between these components in the RF front end circuitry 10 in order to enable transmission and reception of RF signals within a number of RF operating bands, and may enable carrier aggregation and/or MIMO in one or more of these RF operating bands as discussed below.

Figure 2A:
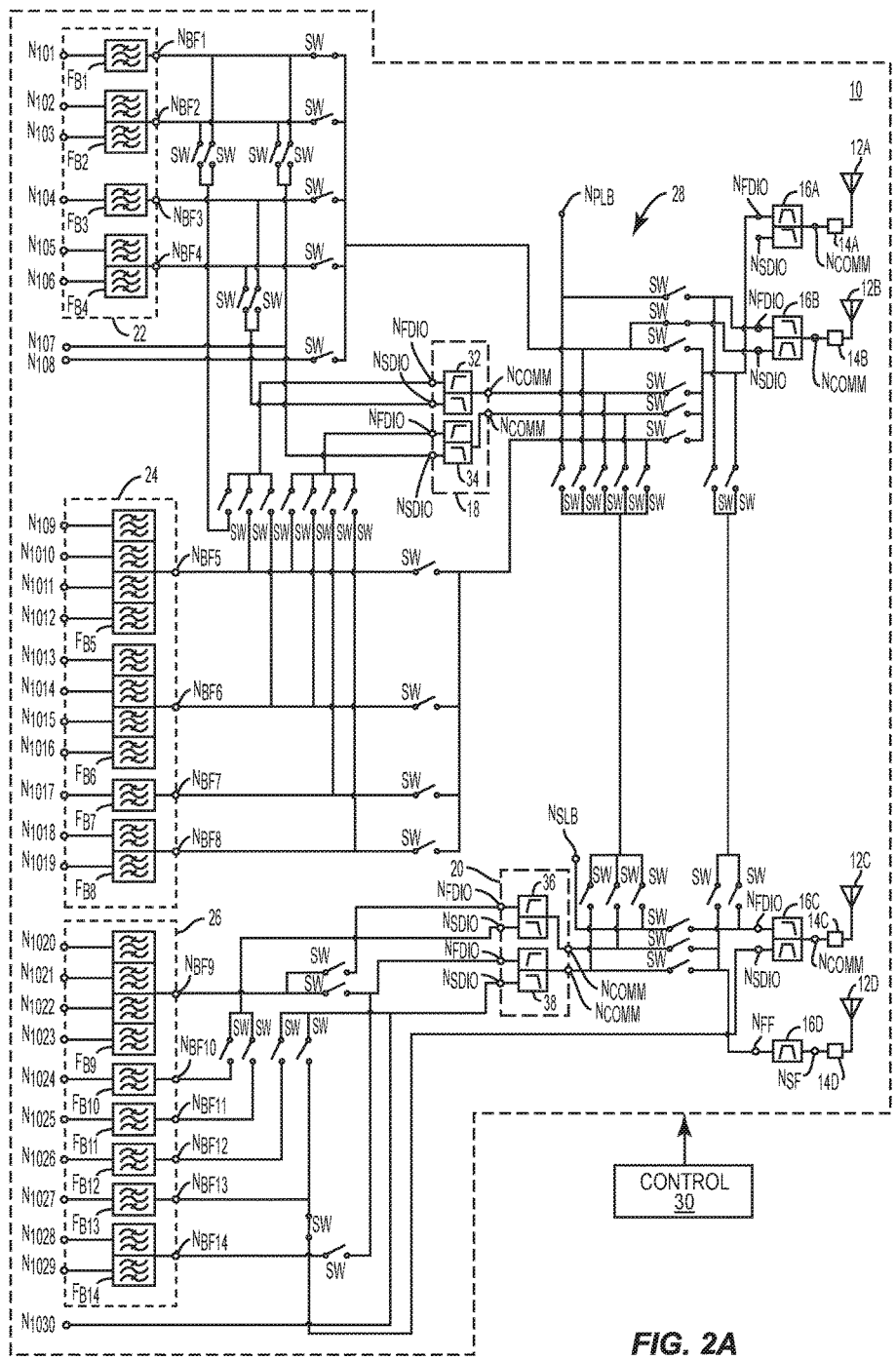
FIG. 2A shows a switching configuration for RF front end circuitry according to one embodiment of the present disclosure.

FIG. 2A shows a first switching configuration for the RF front end circuitry 10 in which RF signals within the first RF operating band are transmitted and received from the RF front end circuitry 10. In such a configuration, the switching circuitry 28 couples the first band filter node $N_{BF1}$ to the second diplexer input/output node $N_{SDIO}$ of the second antenna-side filtering circuitry 16B such that the primary intermediate filtering circuitry 18 is bypassed. The switching circuitry 28 may further couple the thirteenth band filter $F_{B13}$ to the second diplexer input/output node $N_{SDIO}$ of the third antenna-side filtering circuitry 16C such that the secondary intermediate filtering circuitry 20 is bypassed. In such a switching configuration, primary RF transmit signals within the first RF operating band provided at the first input/output node $N_{IO1}$ are passed via the first band filter $F_{B1}$ and the second antenna-side filtering circuitry 16B to the second antenna 12B for transmission, primary RF receive signals within the first RF operating band received at the second antenna 12B are passed via the second antenna-side filtering circuitry 16B and the first band filter $F_{B1}$ to the first input/output node $N_{IO1}$ for further processing, and secondary RF receive signals within the first RF operating band received at the third antenna 12C are passed via the third antenna-side filtering circuitry 16C and the thirteenth band filter $F_{B13}$ to the twenty-seventh input/output node $N_{IO27}$ for further processing. The RF transmit signals and the RF receive signals at the first input/output node $N_{IO1}$ are time-division duplexed in this configuration. As necessary, the antenna 12 coupled to the first band filter $F_{B1}$ and the thirteenth band filter $F_{B13}$ may be swapped in order to improve transmission and/or reception characteristics. Such features will be appreciated by those skilled in the art, and thus are not discussed in detail herein.

Figure 2B:
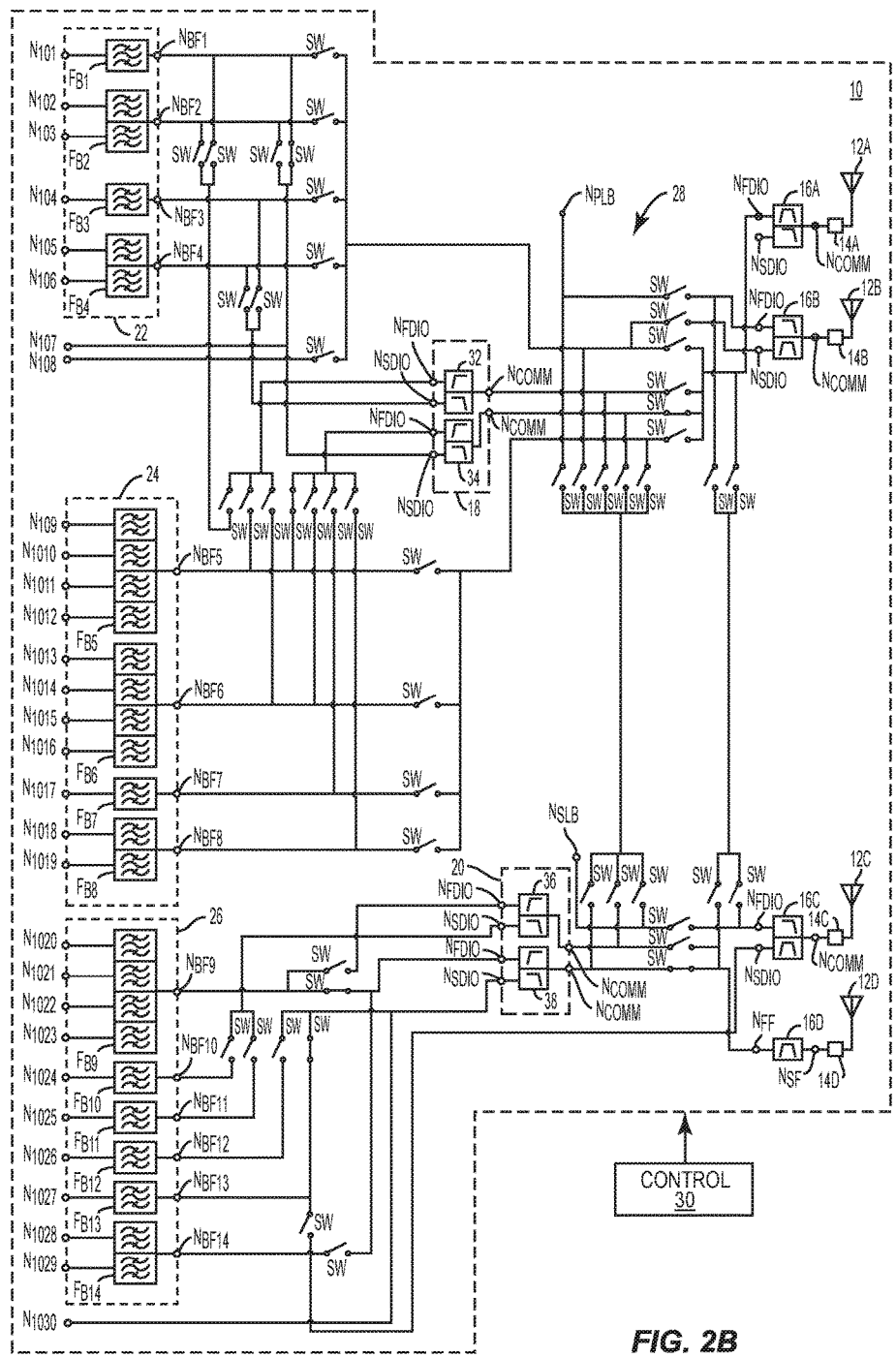
FIG. 2B shows a switching configuration for RF front end circuitry according to one embodiment of the present disclosure.

As discussed above, it may be desirable to perform carrier aggregation to increase throughput. FIG. 2B shows a second switching configuration for the RF front end circuitry 10 in which RF signals within the first RF operating band are carrier aggregated with RF signals within the sixth RF operating band. In such a configuration, the switching circuitry 28 couples the first band filter node $N_{BF1}$ to the second diplexer input/output node $N_{SDIO}$ of the second primary intermediate diplexer 34, couples the fifth band filter node $N_{BF5}$ to the first diplexer input/output node $N_{FDIO}$ of the second primary intermediate diplexer 34, and couples the common node $N_{COMM}$ of the first primary intermediate diplexer 32 to the first diplexer input/output node $N_{FDIO}$ of the first antenna-side filtering circuitry 16A. Further, the switching circuitry 28 may couple the ninth band filter node $N_{BF9}$ to the first diplexer input/output node $N_{FDIO}$ of the second secondary intermediate diplexer 38, couple the thirteenth band filter node $N_{BF13}$ to the second diplexer input/output node $N_{SDIO}$ of the second secondary intermediate diplexer 38, and couple the common node $N_{COMM}$ of the second secondary intermediate diplexer 38 to the first filter node $N_{FF}$ of the fourth antenna-side filtering circuitry 16D. In such a switching configuration, primary RF transmit signals within the sixth RF operating band provided at the twelfth input/output node $N_{IO12}$ are passed via the fifth band filter $F_{B5}$, the first primary intermediate diplexer 32, and the first antenna-side filtering circuitry 16A to the first antenna 12A for transmission, primary RF receive signals within the sixth RF operating band received at the first antenna 12A are passed via the first antenna-side filtering circuitry 16A, the first primary intermediate diplexer 32, and the fifth band filter $F_{B5}$ to the thirteenth input/output node $N_{IO13}$, secondary RF receive signals within the sixth RF operating band received at the fourth antenna 12D are passed via the fourth antenna-side filtering circuitry 16D, the second secondary intermediate diplexer 38, and the ninth band filter $F_{B9}$ to the twenty-second input/output node $N_{IO22}$ for further processing, and secondary RF receive signals within the first RF operating band received at the fourth antenna 12D are passed via the fourth antenna-side filtering circuitry 16D, the second secondary intermediate diplexer 38, and the thirteenth band filter $F_{B13}$ to the twenty-seventh input/output node $N_{IO27}$ for further processing. As necessary, the antenna 12 coupled to the first band filter $F_{B1}$, the fifth band filter $F_{B5}$, the ninth band filter $F_{B9}$, and the thirteenth band filter $F_{B13}$ may be swapped in order to improve transmission and/or reception characteristics. Such features will be appreciated by those skilled in the art, and thus are not discussed in detail herein.

A simple change in routing of the signals via the switching circuitry 28 may be used to perform carrier aggregation between RF signals within the first RF operating band and RF signals within the seventh RF operating band or between RF signals within the first RF operating band and the eighth RF operating band, for example, by coupling the sixth band filter node $N_{BF6}$ to the first diplexer input/output node $N_{FDIO}$ of the second primary intermediate diplexer 34 instead of the fifth band filter node $N_{BF5}$ as discussed above. A similar strategy may be used to perform carrier aggregation between any number of different RF operating bands, the details of which will be readily appreciated by those skilled in the art and are thus not discussed in detail herein.

Figure 2C:
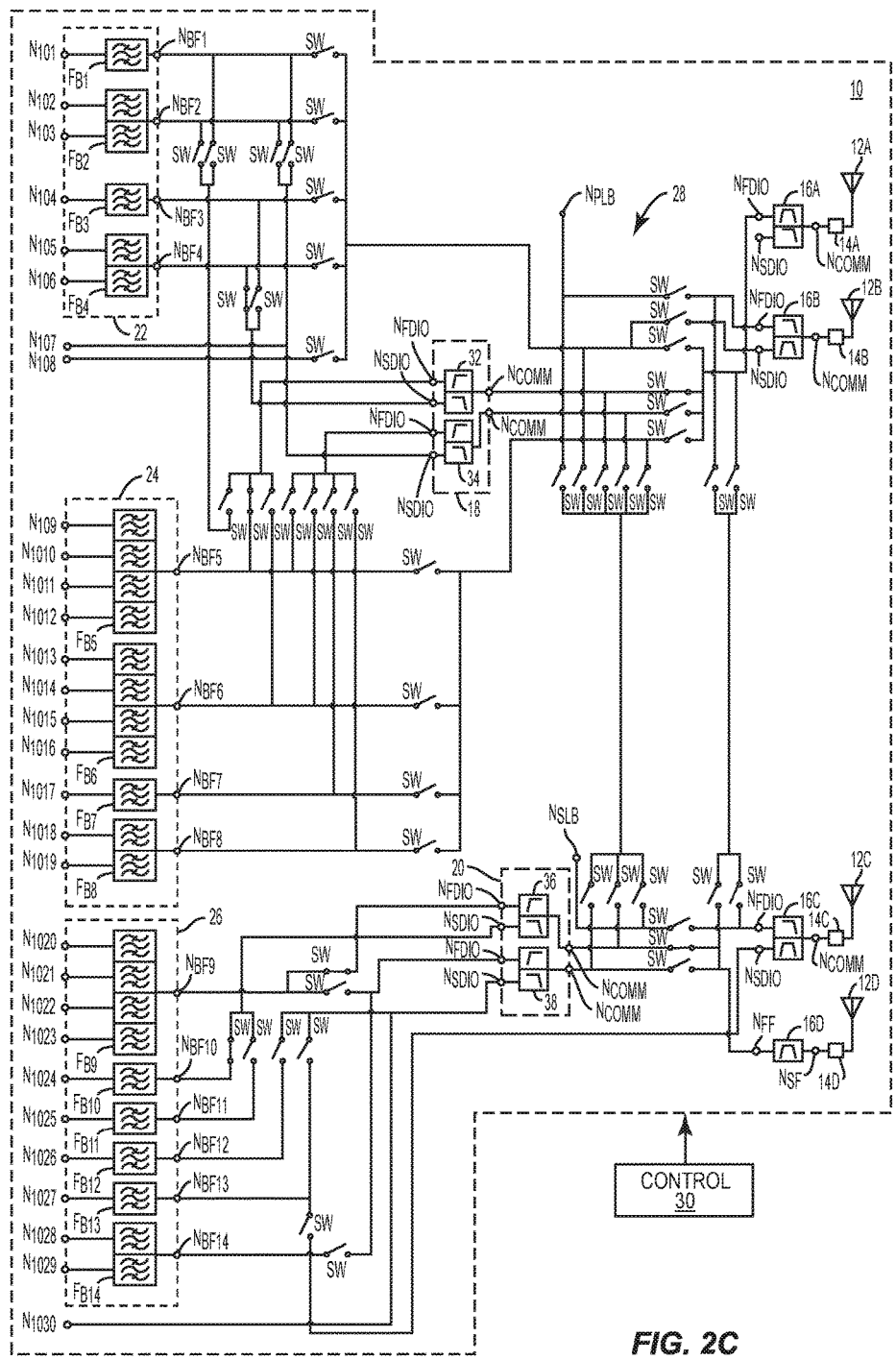
FIG. 2C shows a switching configuration for RF front end circuitry according to one embodiment of the present disclosure.

FIG. 2C shows a third switching configuration for the RF front end circuitry 10 in which RF signals within the fourth RF operating band and the fifth RF operating band are carrier aggregated. In such a configuration, the switching circuitry 28 couples the fourth band filter node $N_{BF4}$ to the second diplexer input/output node $N_{SDIO}$ of the first primary intermediate diplexer 32, couples the fifth band filter node $N_{BF5}$ to the first diplexer input/output node $N_{FDIO}$ of the first primary intermediate diplexer 32, and couples the common node $N_{COMM}$ of the first primary intermediate diplexer 32 to the first diplexer input/output node $N_{FDIO}$ of the first antenna-side filtering circuitry 16A. Further, the switching circuitry 28 may couple the ninth band filter node $N_{BF9}$ to the first diplexer input/output node $N_{FDIO}$ of the first secondary intermediate diplexer 36, couple the tenth band filter node $N_{BF10}$ to the second diplexer input/output node $N_{SDIO}$ of the first secondary intermediate diplexer 36, and couple the common node $N_{COMM}$ of the first secondary intermediate diplexer 36 to the first filter node $N_{FF}$ of the fourth antenna-side filtering circuitry 16D. In such a switching configuration, primary RF transmit signals within the fourth RF operating band provided at the fifth input/output node $N_{IO5}$ are passed via the fourth band filter $F_{B4}$, the first primary intermediate diplexer 32, and the first antenna-side filtering circuitry 16A to the first antenna 12A for transmission, primary RF receive signals within the fourth RF operating band received at the first antenna 12A are passed via the first antenna-side filtering circuitry 16A, the first primary intermediate diplexer 32, and the fourth band filter $F_{B4}$ to the sixth input/output node $N_{IO6}$ for further processing, and primary RF receive signals within the fifth RF operating band received at the first antenna 12A are passed via the first antenna-side filtering circuitry 16A, the first primary intermediate diplexer 32, and the fifth band filter $F_{B5}$ to the tenth input/output node $N_{IO10}$ for further processing. Further, secondary RF receive signals within the fourth RF operating band received at the fourth antenna 12D are passed via the fourth antenna-side filtering circuitry 16D, the first secondary intermediate diplexer 36, and the tenth band filter $F_{B10}$ to the twenty-fourth input/output node $N_{IO24}$ for further processing and secondary RF receive signals within the fifth RF operating band received at the fourth antenna 12D are passed via the fourth antenna-side filtering circuitry 16D, the first secondary intermediate diplexer 36, and the ninth band filter $F_{B9}$ to the twenty-second input/output node $N_{IO22}$ for further processing. As necessary, the antenna 12 coupled to the fourth band filter $F_{B4}$, the fifth band filter $F_{B5}$, the ninth band filter $F_{B9}$, and the thirteenth band filter $F_{B13}$ may be swapped in order to improve transmission and/or reception characteristics. Such features will be appreciated by those skilled in the art, and thus are not discussed in detail herein.

Figure 2D:
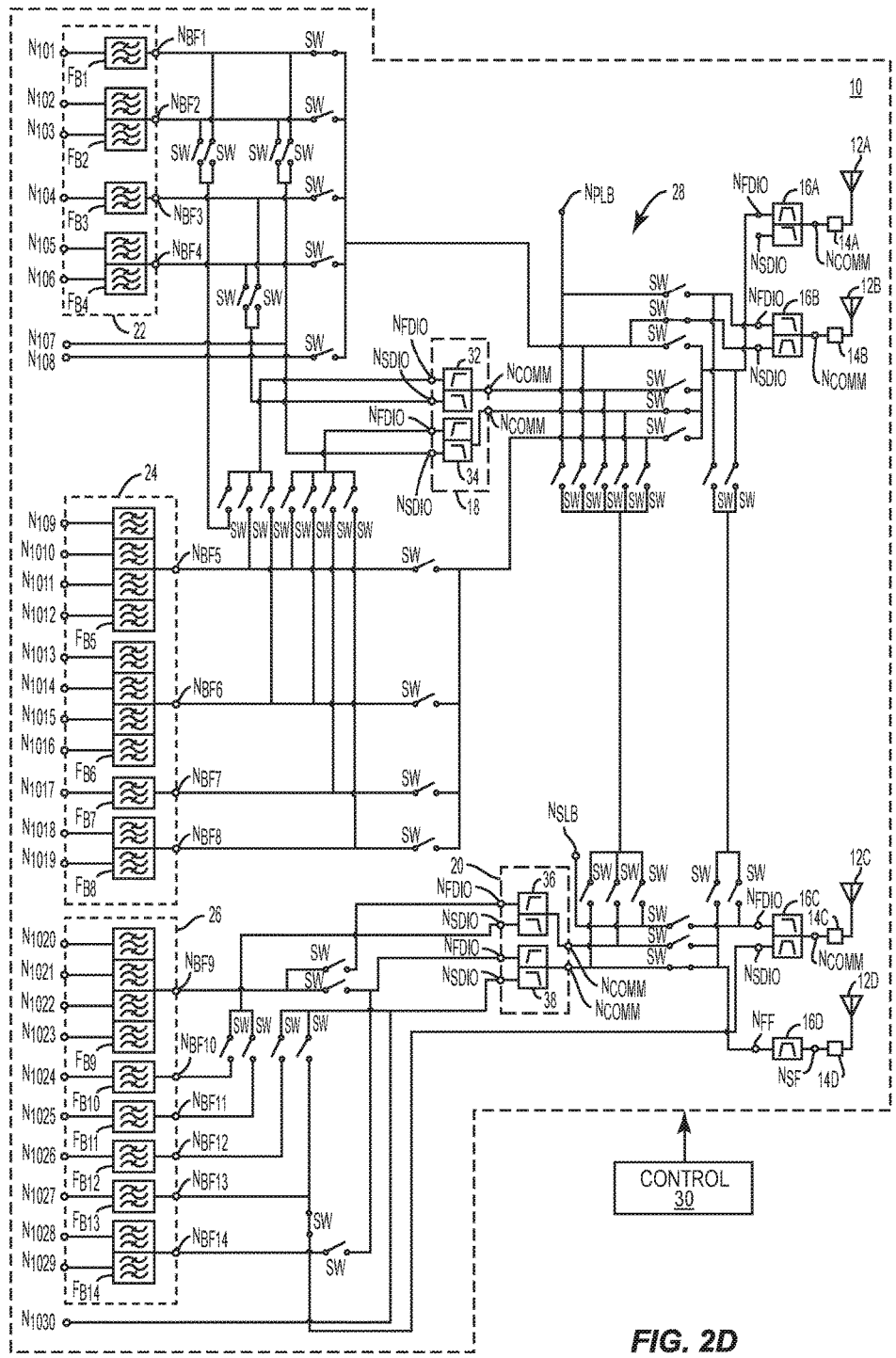
FIG. 2D shows a switching configuration for RF front end circuitry according to one embodiment of the present disclosure.

It may also be desirable to support 4x4 MIMO to increase throughput and/or reliability. Accordingly, FIG. 2D shows a fourth switching configuration for the RF front end circuitry 10 in which four MIMO streams within the first RF operating band are simultaneously received. In such a configuration, the switching circuitry 28 couples the seventh input/output node $N_{IO7}$ to the second diplexer input/output node $N_{SDIO}$ of the second primary intermediate diplexer 34, couples the common node $N_{COMM}$ of the second primary intermediate diplexer 34 to the first diplexer input/output node $N_{FDIO}$ of the first antenna-side filtering circuitry 16A, couples the first band filter node $N_{BF1}$ to second diplexer input/output node $N_{SDIO}$ of the second antenna-side filtering circuitry 16B, couples the thirteenth band filter node $N_{BF13}$ to the second diplexer input/output node $N_{SDIO}$ of the third antenna-side filtering circuitry 16C, couples the twenty-ninth input/output node $N_{IO29}$ to the second diplexer input/output node $N_{SDIO}$ of the second secondary intermediate diplexer 38, and couples the common node $N_{COMM}$ of the second secondary intermediate diplexer 38 to the first filter node $N_{FF}$ of the fourth antenna-side filtering circuitry 16D. In such an embodiment, MIMO receive signals within the first RF operating band received at the first antenna 12A are passed via the first antenna-side filtering circuitry 16A and the second primary intermediate diplexer 34 to the seventh input/output node $N_{IO7}$ for further processing, MIMO receive signals within the first RF operating band received at the second antenna 12B are passed via the second antenna-side filtering circuitry 16B and the first band filter $F_{B1}$ to the first input/output node $N_{IO1}$ for further processing, MIMO receive signals within the first RF operating band received at the third antenna 12C are passed via the third antenna-side filtering circuitry 16C and the thirteenth band filter $F_{B13}$ to the twenty-seventh input/output node $N_{IO27}$ for further processing, and MIMO receive signals within the first RF operating band received at the fourth antenna 12D are passed via the fourth antenna-side filtering circuitry 16D and the second secondary intermediate diplexer 38 to the thirtieth input/output node $N_{IO30}$ for further processing.

The MIMO receive signals may span multiple operating bands in various embodiments. Such configurations may be provided by opening and closing different ones of the switches SW in the switching circuitry 28, as will be appreciated by those skilled in the art. For example, one or more 4x4 MIMO configurations may be provided such that RF signals are simultaneously transmitted and received on both the second RF operating band and the eighth RF operating band, such that RF signals are simultaneously transmitted and received on the eighth RF operating band and received on the first RF operating band, such that RF signals are simultaneously transmitted and received on both the fourth RF operating band and the sixth RF operating band, and such that RF signals are simultaneously received in the third RF operating band.

Figure 2E:
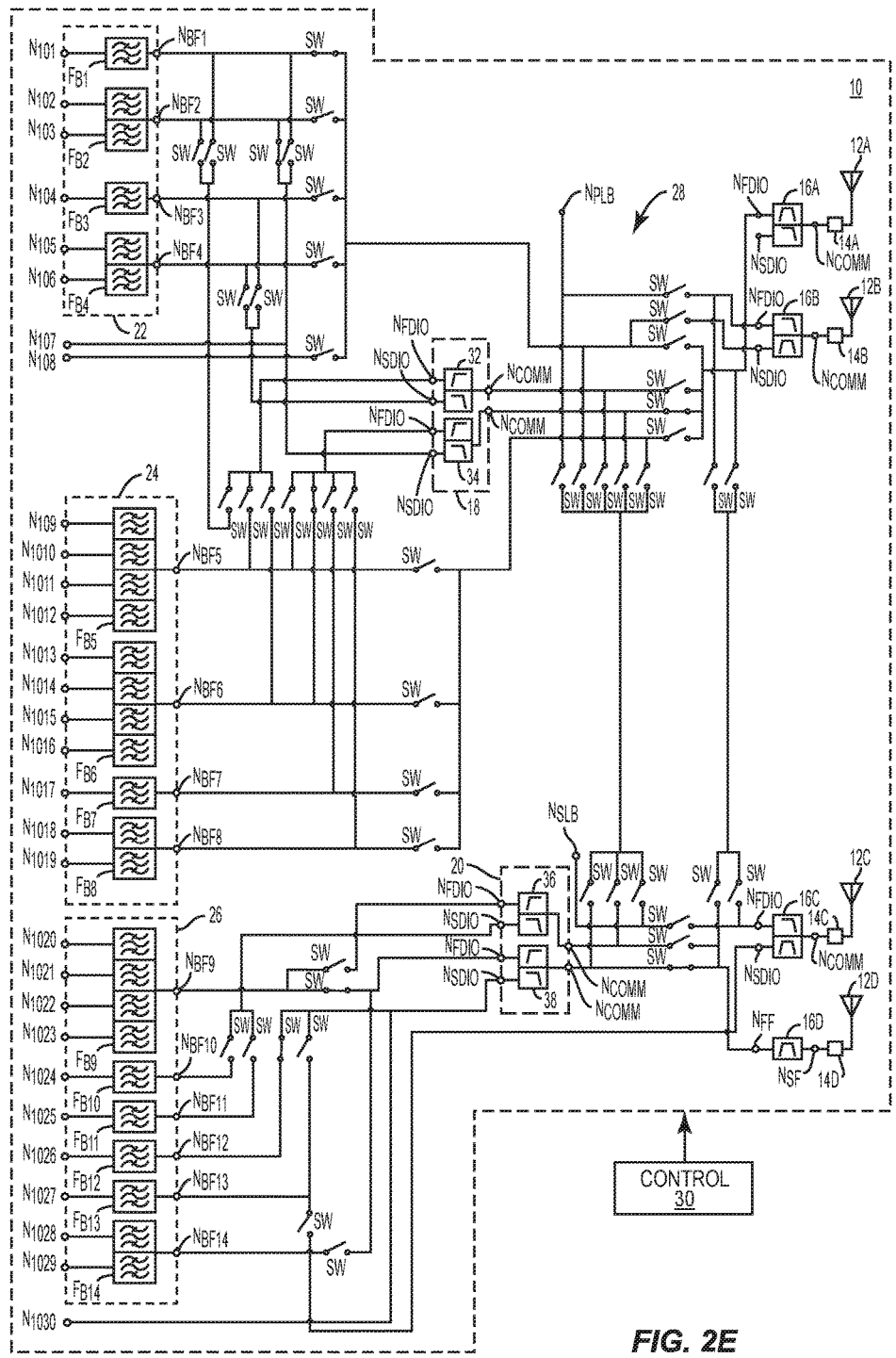
FIG. 2E shows a switching configuration for RF front end circuitry according to one embodiment of the present disclosure.

FIG. 2E shows a fifth switching configuration for the RF front end circuitry 10 in which four MIMO streams within the second RF operating band and the eighth RF operating band are simultaneously transmitted and received. In such a configuration, the switching circuitry 28 couples the second band filtering node $N_{BF2}$ to the second diplexer input/output node $N_{SDIO}$ of the second primary intermediate diplexer 34, couples the fifth band filter node $N_{BF5}$ to the first diplexer input/output node $N_{FDIO}$ of the second primary intermediate diplexer 34, and couples the common node $N_{COMM}$ of the second primary intermediate diplexer 34 to the first diplexer input/output node $N_{FDIO}$ of the first antenna-side filtering circuitry 16A. Further, the switching circuitry 28 couples the ninth band filter node $N_{BF9}$ to the first diplexer input/output node $N_{FDIO}$ of the second secondary intermediate diplexer 38, couples the twelfth band filter node $N_{BF12}$ to the second diplexer input/output node $N_{SDIO}$ of the second secondary intermediate diplexer 38, and couples the common node $N_{COMM}$ of the second secondary intermediate diplexer 38 to the first filter node $N_{FF}$ of the fourth antenna-side filtering circuitry 16D. In such an embodiment, MIMO transmit signals within the second RF operating band are passed from the second input/output node $N_{IO2}$ to the first antenna 12A via the second band filtering circuitry $F_{B2}$, the second secondary intermediate diplexer 34, and the first antenna-side filtering circuitry 16A, MIMO receive signals within the second RF operating band are passed through the same path to the third input/output node $N_{IO3}$, MIMO transmit signals within the eighth RF operating band (which, as discussed above, coincides with the fifth RF operating band), are passed from the thirteenth input/output node $N_{IO13}$ to the first antenna 12A via the sixth band filtering circuitry $F_{B6}$, the second secondary intermediate diplexer 34, and the first antenna-side filtering circuitry 16A, MIMO receive signals within the second RF operating band are passed from the fourth antenna 12D to the twenty-sixth input/output node $N_{IO26}$ via the fourth antenna-side filtering circuitry 16D, the second secondary intermediate diplexer 38, and the twelfth band filtering circuitry $F_{B12}$, and MIMO receive signals within the eighth RF operating band are passed from the fourth antenna 12D to the twenty-first input/output node $N_{IO26}$ via the fourth antenna-side filtering circuitry 16D, the second secondary intermediate diplexer 28, and the ninth band filtering circuitry $F_{B9}$.

As discussed above, the primary intermediate filtering circuitry 18 and the secondary intermediate filtering circuitry 20 were provided primarily to separate signals that are relatively close in frequency for purposes of carrier aggregation. However, by arranging the switching circuitry 28 as shown in FIG. 1 and operating it as described herein, 4x4 MIMO may be supported without adding additional band filters as would conventionally be required. In general, the filters in the primary intermediate filtering circuitry 18 and the secondary intermediate filtering circuitry 20 can be re-used to support 4×4 MIMO without the addition of extra band filters. In many of these situations, a band filter in addition to the diplexers in the primary intermediate filtering circuitry 18 and the secondary intermediate filtering circuitry is not required, as the diplexer in the primary intermediate filtering circuitry 18 and the second intermediate filtering circuitry 20 provides sufficient isolation for MIMO receive signals. Accordingly, a band filter may not be provided in at least one of the receive signal paths for a MIMO receive signal in some embodiments. Those skilled in the art will appreciate that reducing the number of band filters will reduce the size, cost, and complexity of the RF front end circuitry 10. Notably, FIG. 2D is only one exemplary 4×4 MIMO configuration that may be supported by the RF front end circuitry 10. Those skilled in the art will appreciate that additional MIMO configurations may be supported without departing from the principles described herein.

In addition to the functions described above, the switching circuitry 28 may couple the first diplexer input/output node $N_{FDIO}$ of the second antenna-side filtering circuitry 16B to one of a primary low-band signal node $N_{PLB}$ and a secondary low-band signal node $N_{SLB}$ and couple the first diplexer input/output node $N_{FDIO}$ of the third antenna-side filtering circuitry 16C to a different one of the primary low-band signal node $N_{PLB}$ and the secondary low-band signal node $N_{SLB}$. While not shown, the primary low-band signal node $N_{PLB}$ is generally coupled to primary low-band filtering circuitry, and the secondary low-band signal node $N_{SLB}$ is generally coupled to secondary low-band filtering circuitry.

Figure 3:
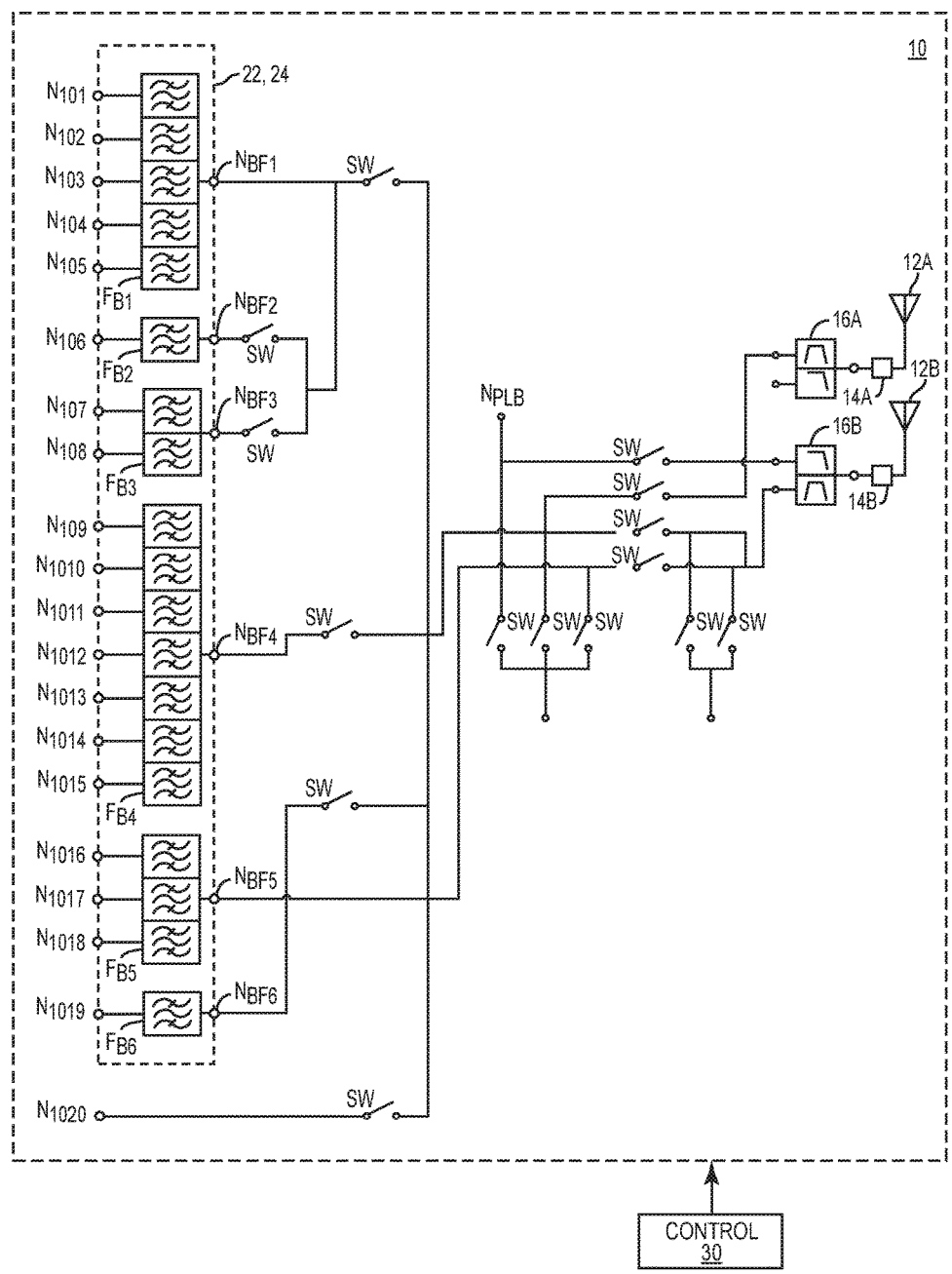
FIG. 3 is a functional schematic of RF front end circuitry according to one embodiment of the present disclosure.

While the above examples use the primary intermediate filtering circuitry 18 and the secondary intermediate filtering circuitry 20 to support 4×4 MIMO without the addition of band filters to the RF front end circuitry 10, the present disclosure is not so limited. Accordingly, FIG. 3 shows the RF front end circuitry 10 according to an additional embodiment. The RF front end circuitry 10 shown in FIG. 3 is substantially similar to that shown in FIG. 1, except that only two antennas 12 are shown, and the RF front end circuitry 10 does not include the primary intermediate filtering circuitry 18, the secondary intermediate filtering circuitry 20, and the secondary band filtering circuitry 26. Further, the first primary band filtering circuitry 22 and the second primary band filtering circuitry 24 are combined. The configuration of the switches SW in the switching circuitry 28 is also changed to accommodate the particular layout of the components in the RF front end circuitry 10 as shown in FIG. 3. Those skilled in the art will appreciate that only the primary transmit/receive signal path is shown in FIG. 3, as opposed to FIG. 1, which shows both the primary transmit/receive signal path and the secondary receive signal paths.

Rather than relying on the diplexers in the primary intermediate filtering circuitry 18 and the secondary intermediate filtering circuitry 20, the RF front end circuitry 10 shown in FIG. 3 uses multiplexers in order to separate RF signals within different RF operating bands. Accordingly, the combined first primary band filtering circuitry 22 and second primary band filtering circuitry 24 includes a first band filter $F_{B1}$ configured to pass RF transmit signals within the eighth RF operating band between a first input/output node $N_{IO1}$ and a first band filter node $N_{BF1}$ while attenuating other signals between the first input/output node $N_{IO1}$ and the first band filter node $N_{BF1}$, pass RF transmit signals within the seventh RF operating band between a second input/output node $N_{IO2}$ and the first band filter node $N_{BF1}$ while attenuating other signals between the second input/ output node $N_{IO2}$ and the first band filter node $N_{BF1}$, pass RF receive signals within the eighth RF operating band between the first band filter node $N_{BF1}$ and a third input/output node $N_{IO3}$ while attenuating other signals between the first band filter node $N_{BF1}$ and the third input/output node $N_{IO3}$, pass RF receive signals within the seventh RF operating band between the first band filter node $N_{BF1}$ and a fourth input/ output node $N_{IO4}$ while attenuating other signals between the first band filter node $N_{BF1}$ and the fourth input/output node $N_{IO4}$, and pass RF transmit signals within the third RF operating band between a fifth input/output node $N_{IO5}$ and the first band filter node $N_{BF1}$ while attenuating other signals between the fifth input/output node $N_{IO5}$ and the first band filter node $N_{BF1}$.

A second band filter $F_{B2}$ in the combined first primary band filtering circuitry 22 and second primary band filtering circuitry 24 is configured to pass RF transmit signals and RF receive signals within an eleventh RF operating band between a sixth input/output node $N_{IO6}$ and a second band filter node $N_{BF2}$ while attenuating other signals between the sixth input/output node $N_{IO6}$ and the second band filter node $N_{BF2}$.

A third band filter $F_{B3}$ in the combined first primary band filtering circuitry 22 and second primary band filtering circuitry 24 is configured to pass RF transmit signals within the second RF operating band between a seventh input/ output node $N_{IO7}$ and a third band filter node $N_{BF3}$ while attenuating other signals between the seventh input/output node $N_{IO7}$ and the third band filter node $N_{BF3}$, and pass RF receive signals between the third band filter node $N_{BF3}$ and an eighth input/output node $N_{IO8}$ while attenuating other signals between the third band filter node $N_{BF3}$ and the eighth input/output node $N_{IO8}$.

A fourth band filter $F_{B4}$ in the combined first primary band filtering circuitry 22 and second primary band filtering circuitry 24 is configured to pass RF transmit signals within the fifth RF operating band between a ninth input/output node $N_{IO9}$ and a fourth band filter node $N_{BF4}$ while attenuating other signals between the ninth input/output node $N_{IO9}$ and the fourth band filter node $N_{BF4}$, pass RF transmit signals within the sixth RF operating band between a tenth input/output node $N_{IO10}$ and the fourth band filter node $N_{BF4}$ while attenuating other signals between the tenth input/ output node $N_{IO10}$ and the fourth band filter node $N_{BF4}$, pass RF transmit signals within the fourth RF operating band between an eleventh input/output node $N_{IO11}$ and the fourth band filter node $N_{BF4}$ while attenuating other signals between the eleventh input/output node $N_{IO11}$ and the fourth band filter node $N_{BF4}$, pass RF receive signals within the sixth RF operating band between the fourth band filter node $N_{BF4}$ and a twelfth input/output node $N_{IO12}$ while attenuating other signals between the fourth band filter node $N_{BF4}$ and the twelfth input/output node $N_{IO12}$, pass RF receive signals within the fifth RF operating band between the fourth band filter node $N_{BF4}$ and a thirteenth input/output node $N_{IO13}$ while attenuating other signals between the fourth band filter node $N_{BF4}$ and the thirteenth input/output node $N_{IO13}$, pass RF receive signals within the fourth RF operating band between the fourth band filter node $N_{BF4}$ and a fourteenth input/output node $N_{IO14}$ while attenuating other signals between the fourth band filter node $N_{BF4}$ and the fourteenth input/output node $N_{IO14}$, and pass RF receive signals within the first RF operating band between the fourth band filter node $N_{BF4}$ and a fifteenth input/output node $N_{IO15}$ while attenuating other signals between the fourth band filter node $N_{BF4}$ and the fifteenth input/output node $N_{IO15}$.

A fifth band filter $F_{B5}$ in the combined first primary band filtering circuitry 22 and second primary band filtering circuitry 24 is configured to pass RF transmit signals and RF receive signals within the first RF operating band between a sixteenth input/output node $N_{IO16}$ and a fifth band filter node $N_{BF5}$ while attenuating other signals between the sixteenth input/output node $N_{IO16}$ and the fifth band filter node $N_{BF5}$, pass RF transmit signals and RF receive signals within the ninth RF operating band between a seventeenth input/output node $N_{IO17}$ and the fifth band filter node $N_{BF5}$ while attenuating other signals between the seventeenth input/output node $N_{IO17}$ and the fifth band filter node $N_{BF5}$, and pass RF transmit signals and RF receive signals within the tenth RF operating band between an eighteenth input/output node $N_{IO18}$ and the fifth band filter node $N_{BF5}$ while attenuating other signals between the eighteenth input/output node $N_{IO18}$ and the fifth band filter node $N_{BF5}$.

A sixth band filter $F_{B6}$ in the combined first primary band filtering circuitry 22 and second primary band filtering circuitry 24 is configured to pass RF transmit signals and RF receive signals within the third RF operating band between a nineteenth input/output node $N_{IO19}$ and a sixth band filter node $N_{BF6}$ while attenuating other signals between the nineteenth input/output node $N_{IO19}$ and the sixth band filter node $N_{BF6}$.

While not shown, each one of the input/output nodes $N_{IO}$ may be coupled to a downstream power amplifier (in the case that RF transmit signals are provided to the node) or low-noise amplifier (in the case that RF receive signals are received from the node). A twentieth input/output node $N_{IO20}$ may not be associated with a band filter $B_F$ such that this input/output node $N_{IO}$ connects directly to a downstream low-noise amplifier (not shown) in certain modes.

The first RF operating band, the second RF operating band, the third RF operating band, the fourth RF operating band, the fifth RF operating band, the sixth RF operating band, the seventh RF operating band, the eighth RF operating band, the ninth RF operating band, the tenth RF operating band, and the eleventh RF operating band may be any of the 3GPP LTE operating bands as discussed above. In one embodiment, the eleventh RF operating band is 3GPP LTE band 38, which is a TDD band including frequencies between 2570 MHz and 2620 MHz.

In non-carrier aggregation and non-MIMO modes of the RF front end circuitry 10 shown in FIG. 3, the switching circuitry 28 may be configured to couple one of the band filters $F_B$ to one of the antennas 12 such that RF signals within a single RF operating band may be transmitted and received. In carrier aggregation configurations of the RF front end circuitry 10, the switching circuitry 28 may be configured to couple one or more of the band filters $F_B$ to one of the antennas 12 such that RF signals within multiple RF operating bands or different carriers of an RF operating band can be simultaneously transmitted and received. In MIMO configurations of the RF front end circuitry 10, the switching circuitry 28 may be configured to couple a first one of the band filters $B_F$ to a first one of the antennas 12 and couple a second one of the band filters $B_F$ to a second one of the antennas 12. Notably, the band filters $B_F$ are provided as shown in FIG. 3 to support various desired carrier aggregation configurations. That is, the filter responses of each one of the band filters $B_F$ are provided in order to support the simultaneous transmission and/or reception of RF signals within different combinations of RF operating bands. While conventional approaches to supporting MIMO have involved providing additional MIMO filters in the band filtering circuitry for isolating the various desired signals, the inventors of the subject matter of the present disclosure discovered that different filters used to support different RF operating band combinations for carrier aggregation may be reused to support MIMO as well. Accordingly, additional filters do not need to be added to the combined first primary band filtering circuitry 22 and second primary band filtering circuitry 24, thereby reducing the size of the RF front end circuitry 10 and reducing insertion loss in one or more signal paths thereof.

As an example, the fourth band filter $F_{B4}$ is configured to support carrier aggregation between various FDD operating bands, RF receive signals within the first RF operating band are often carrier aggregated with other FDD bands, and thus the fourth band filter $F_{B4}$ is configured to pass RF receive signals within the first RF operating band between the fourth band filter node $N_{BF4}$ and the fifteenth input/output node $N_{IO15}$. The fifth band filter $F_{B5}$ is configured to support carrier aggregation between various TDD operating bands, and thus is also configured to pass RF receive signals within the first RF operating band between the fifth band filter node $N_{BF5}$ and the sixteenth input/output node $N_{IO16}$. By coupling the fourth band filter $F_{B4}$ to a first one of the antennas 12 and coupling the fifth band filter $F_{B5}$ to a second one of the antennas 12, downlink MIMO for signals within the first RF operating band may be provided without additional filters in the RF front end circuitry 10.

Those skilled in the art will recognize improvements and modifications to the preferred embodiments of the present disclosure. All such improvements and modifications are considered within the scope of the concepts disclosed herein and the claims that follow.

What is claimed is:
1. Radio frequency (RF) front end circuitry comprising:
a first antenna node and a second antenna node;
a diplexer configured to:
  pass RF signals within a first RF frequency band between a first diplexer node and a common node;
  attenuate RF signals within a second RF frequency band between the first diplexer node and the common node;
  pass RF signals within the second RF frequency band between a second diplexer node and the common node; and
  attenuate RF signals within the first RF frequency band between the second diplexer node and the common node;
a first band filter configured to pass RF signals within a first RF operating band of the first RF frequency band between a first band filter node and a first input/output node while attenuating signals outside the first RF operating band;
a second band filter configured to pass RF signals within a second RF operating band of the second RF frequency band between a second band filter node and a second input/output node while attenuating signals outside the second RF operating band; and
switching circuitry configured to:
  in a carrier aggregation mode, couple the common node to one of the first antenna node and the second antenna node, couple the first diplexer node to the first band filter node, and couple the second diplexer node to the second band filter node; and
  in a multiple-input-multiple-output (MIMO) mode, couple the common node to a first selected antenna node among the first antenna node and the second antenna node, couple the first band filter node to a second selected antenna node among the first antenna node and the second antenna node, and couple the first diplexer node to a third input/output node.

2. The RF front end circuitry of claim 1 wherein:
in the carrier aggregation mode, RF signals within the first RF operating band and RF signals within the second RF operating band are received at the first antenna node and the second antenna node and separately provided to the first input/output node and the second input/output node, respectively; and
in the MIMO mode, different RF signals within the first RF operating band are received at the first antenna node and the second antenna node and separately provided to the first input/output node and the third input/output node.

3. The RF front end circuitry of claim 2 wherein the first RF operating band is Third Generation Partnership Project (3GPP) Long Term Evolution (LTE) band 41 and the second RF operating band is 3GPP LTE band 1.

4. The RF front end circuitry of claim 1 wherein the first RF operating band is Third Generation Partnership Project (3GPP) Long Term Evolution (LTE) band 41 and the second RF operating band is 3GPP LTE band 1.

5. The RF front end circuitry of claim 1 further comprising:
a third antenna node and a fourth antenna node;
an additional diplexer configured to:
pass RF signals within the first RF frequency band between a first additional diplexer node and an additional common node;
attenuate RF signals within a second RF frequency band between the first additional diplexer node and the additional common node;
pass RF signals within the second RF frequency band between a second additional diplexer node and the additional common node; and
attenuate RF signals within the first RF frequency band between the second additional diplexer node and the additional common node;
a third band filter configured to pass RF signals within the first RF operating band between a third band filter node and a fourth input/output node while attenuating signals outside the first RF operating band; and
a fourth band filter configured to pass RF signals within the second RF operating band between a fourth band filter node and a fifth input/output node while attenuating signals outside the second RF operating band, wherein the switching circuitry is further configured to:
in the carrier aggregation mode, couple the additional common node to one of the third antenna node and the fourth antenna node, couple the first additional diplexer node to the third band filter node, and couple the second additional diplexer node to the fourth band filter node; and
in the MIMO mode, couple the additional common node to a third selected antenna node among the third antenna node and the fourth antenna node, couple the third band filter node to a fourth selected antenna node among the third antenna node and the fourth antenna node, and couple the first additional diplexer node to a sixth input/output node.

6. The RF front end circuitry of claim 1 wherein:
in the carrier aggregation mode:
RF signals within the first RF operating band and RF signals within the second RF operating band are received at the first antenna node and the second antenna node and separately provided to the first input/output node and the second input/output node, respectively; and
RF signals within the first RF operating band and RF signals within the second RF operating band are received at the third antenna node and the fourth antenna node and separately provided to the fourth input/output node and the fifth input/output node; and
in the MIMO mode:
different RF signals within the first RF operating band are received at the first antenna node and the second antenna node and separately provided to the first input/output node and the third input/output node; and
different RF signals within the first RF operating band are received at the third antenna node and the fourth antenna node and separately provided to the fourth input/output node and the sixth input/output node.

7. The RF front end circuitry of claim 6 wherein the first RF operating band is Third Generation Partnership Project (3GPP) Long Term Evolution (LTE) band 41 and the second RF operating band is 3GPP LTE band 1.

8. The RF front end circuitry of claim 5 wherein the first RF operating band is Third Generation Partnership Project (3GPP) Long Term Evolution (LTE) band 41 and the second RF operating band is 3GPP LTE band 1.

9. Radio frequency (RF) front end circuitry comprising:
a primary antenna node and a secondary antenna node;
a first multiplexer configured to:
pass RF signals within a first RF operating band between a first common node and a first input/output node;
attenuate signals outside the first RF operating band between the first common node and the first input/output node;
pass RF signals within a second RF operating band between the first common node and a second input/output node; and
attenuate signals outside the second RF operating band between the first common node and the second input/output node;
a second multiplexer configured to:
pass RF signals within the first RF operating band between a second common node and a third input/output node;
attenuate signals outside the first RF operating band between the second common node and the third input/output node;
pass RF signals within a third RF operating band between the second common node and a fourth input/output node; and
attenuate signals outside the third RF operating band between the second common node and the fourth input/output node;
switching circuitry configured to:
in a first carrier aggregation mode, couple the first common node to one of the primary antenna node and the secondary antenna node such that RF signals within the first RF operating band and RF signals within the second RF operating band are received at the primary antenna node and the secondary antenna node and separately provided to the first input/output node and the second input/output node, respectively;
in a second carrier aggregation mode, couple the second common node to one of the primary antenna node and the secondary antenna node such that RF signals within the first RF operating band and RF signals within the third RF operating band are received at the primary antenna node and the secondary antenna node and separately provided to the third input/output node and the fourth input/output node, respectively; and in a multiple-input-multiple-output (MIMO) mode, couple the first common node to a first selected antenna node among the primary antenna node and the secondary antenna node and couple the second common node to a second selected antenna node among the primary antenna node and the secondary antenna node such that different RF signals within the first operating band are received at the primary antenna node and the secondary antenna node and separately provided to the first input/output node and the third input/output node.

10. The RF front end circuitry of claim 9 wherein the first RF operating band is Third Generation Partnership Project (3GPP) Long Term Evolution (LTE) band 41, the second RF operating band is 3GPP LTE band 25, and the third RF operating band is 3GPP LTE band 34.

11. The RF front end circuitry of claim 10 wherein the first RF operating band is Third Generation Partnership Project (3GPP) Long Term Evolution (LTE) band 41, the second RF operating band is 3GPP LTE band 25, and the third RF operating band is 3GPP LTE band 34.

* * * * *